April 12, 1932. J. S. REYNOLDS 1,853,147
CHARGING DEVICE FOR HYDRAULIC BRAKING SYSTEMS
Original Filed April 3, 1925 2 Sheets-Sheet 1
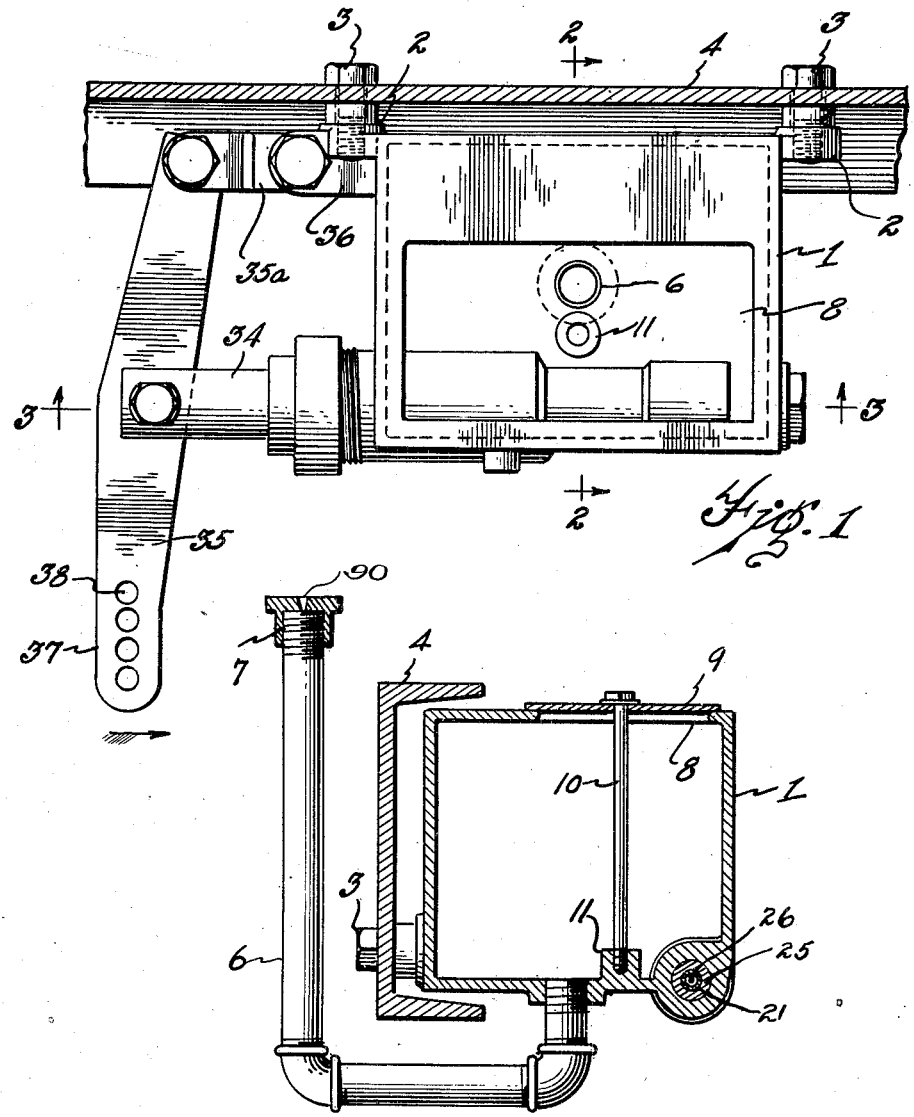
INVENTOR.
Joy S. Reynolds
BY
ATTORNEY.

April 12, 1932.  J. S. REYNOLDS  1,853,147
CHARGING DEVICE FOR HYDRAULIC BRAKING SYSTEMS
Original Filed April 3, 1925   2 Sheets-Sheet 2

INVENTOR.
Joy S. Reynolds
BY
Charles E. Wray
ATTORNEY.

Patented Apr. 12, 1932

1,853,147

UNITED STATES PATENT OFFICE

JOY S. REYNOLDS, OF DETROIT, MICHIGAN

CHARGING DEVICE FOR HYDRAULIC BRAKING SYSTEMS

Application filed April 3, 1925, Serial No. 20,362. Renewed June 14, 1929.

This invention relates to charging devices for hydraulic braking systems for automotive vehicles and the principal object is to provide automatic means for maintaining the system filled with liquid.

With the usual hydraulic braking system it is necessary to manually fill the system with fluid under pressure and to at subsequent times add fluid to the system to compensate for loss of fluid and prevent an accumulation of air pockets in the system.

With my improved charging device the system is automatically charged through operation of the brake pedal and a feature of the invention is in the provision of mechanism actuable by the brake pedal to perform this function.

A further object of the invention is to provide a unique valve mechanism operating in conjunction with a plunger to extract fluid from a reservoir and to discharge it to the braking system, the parts being so arranged as to operate automatically to withdraw oil from the reservoir through operation of the brake pedal and discharge it into the system and to so operate that no oil is withdrawn except as the system requires an additional quantity of oil.

These objects and the various novel features of the invention are hereinafter more fully described and claimed, and the preferred form of construction of a charging unit for a hydraulic brake system embodying my invention is shown in the accompanying drawings in which—

Fig. 1 is a plan view showing my charging unit mounted on the chassis frame of an automotive vehicle.

Fig. 2 is a cross section taken on line 2—2 of Fig. 1.

Figure 3:
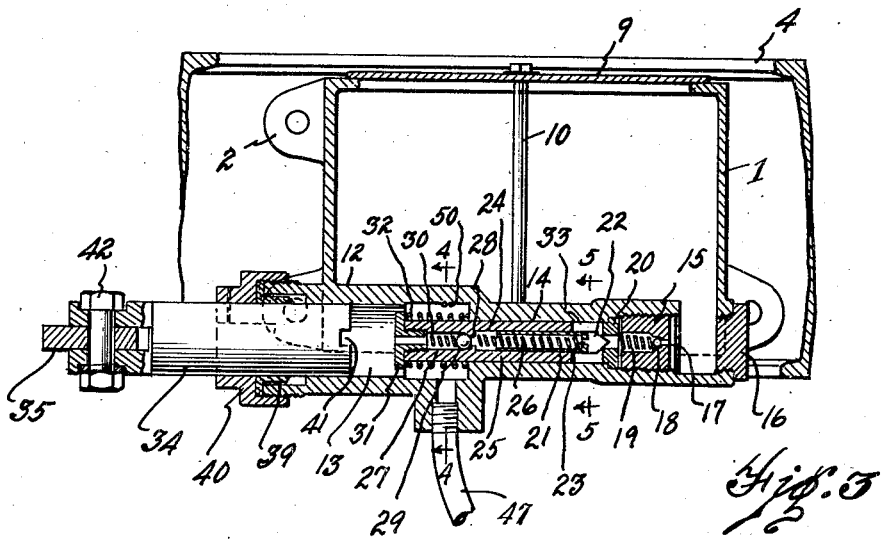
Fig. 3 is a longitudinal section taken on line 3—3 of Fig. 1.

The device comprises a receptacle 1 having lugs 2, 2 at the corners thereof threaded to receive cap screws 3, 3 passing through apertures in the chassis frame 4 and threaded into these lugs. Preferably this receptacle 1 is on the inner side of the chassis frame 4 as will be understood from Fig. 2. To enable the receptacle to be filled with oil or other liquid used in the braking system, I provide a filler tube 6 opening to the bottom of the receptacle as shown in Fig. 2 and extending outwardly and upwardly along the side of the chassis frame to a point above the top of the receptacle. This tube is preferably provided with a cap 7 to close the end thereof when the pipe is not being used to fill the receptacle. Preferably the cap is provided with a small aperture forming a vent 90 for the receptacle. It will also be understood from Figs. 1, 2 and 3 that there is a rectangular aperture 8 in the top of the receptacle, and as shown in Figs. 2 and 3, this aperture is closable by a cover 9 held in place by a screw 10 extending through the cover and into a threaded boss 11 in the bottom of the receptacle. The cover is removed in the view Fig. 1.

The braking sysem may be of any approved hydraulic type. A convenient type is shown in my pending application Serial No. 747,628 filed Nov. 3, 1924 (Patent #1,826,824, granted Oct. 13, 1931) which includes an expanding element to which fluid is delivered by the conduit 47 corresponding to the discharge tube 47 shown in Fig. 3 of this application.

Figure 6:
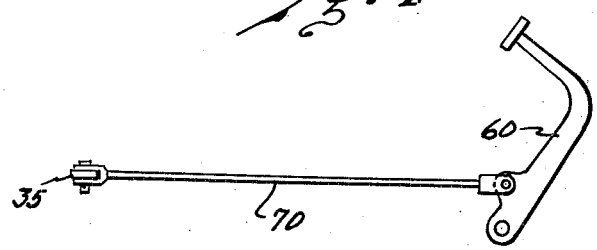
Fig. 6 is a diagram showing a foot operated lever brake and brake rod attached to the operating lever of my improved charging device.

In the bottom of the receptacle and preferably at the inner corner I provide a cylinder 12 having a bore 13 of largest diameter at one end and a bore 14 of smaller diameter intermediate the ends and a plug 15 at the inner end spaced from the end wall of the receptacle as shown in Fig. 3. The end wall of the receptacle is provided with a removable plug 16 providing access to the plug 15. This plug 15 has a central aperture 17 normally closed by a ball 18 held in position by a coiled spring 19. At the inner end of the plug 15 is an apertured seat 20 against which the plunger 21 engages. This plunger 21 is of tubular form and at the forward pointed end, which engages the aperture of the seat 20, is provided with a cross slot 22. This end of the plunger 21 is provided with a central aperture 23 which opens to the hollow interior thereof. This plunger 21 rides in a bore 24 of a piston 25 which in turn is longitudinally movable in the bore 14 of the cylinder 12. A spring 26 tends to move the plunger 21 toward its seat 20. There is a second bore 27 in the piston 25 and the wall between the bores 24 and 27 has an aperture 28 therein normally closed by a ball 29 under action of a spring 30. There is also provided an apertured plug 31 in the bore 27. This plug has a head that is slightly larger in diameter than the piston 25 and a spring 32 is provided between the head and the rear end of the bore 13 of the cylinder 12 which tends to move the plunger toward the left of Fig. 3. It will be noted that there is normally a chamber 33 between the seat 20 and the adjacent end of the piston 25 and that this chamber may be placed in communication with the bore 13 through the aperture 23, the bore 24, aperture 28 and bore 27 of the piston 25. In the forward end of the bore 13 is a piston 34 reciprocable therein by means of the lever 35 to which the piston 34 is pivoted. The lever is pivoted at one end to a link 35a which in turn is pivoted to a bracket 36 at one end of the receptacle. The opposite end 37 of the lever is connected with the brake rod 70 as indicated in the diagram Fig. 6 and there are a series of apertures 38 in the lever end to adjust the length of throw of the lever. This piston 34 is surrounded by a leather or an equivalent packing member 39 lying in an enlarged recess in the forward end of the bore 13 and secured in place by a centrally apertured nut 40 threaded on the projecting end of the member 12 as shown in Fig. 3. This piston 34 is provided at its inner end with a cross slot 41 so that, when the end of the plunger is in contact with the plug 31 in the end of the piston 25, the central aperture of the plug 31 is not closed or restricted. The piston 34 is bifurcated at the outer end providing a slot in which the lever 35 is positioned and a bolt 42 passes through apertures in the said bifurcated end and aperture in the lever 35.

Figure 4:
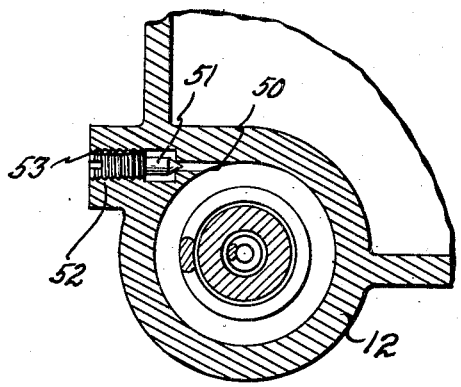
Fig. 4 is a section on an enlarged scale taken on line 4—4 of Fig. 3.
Figure 5:
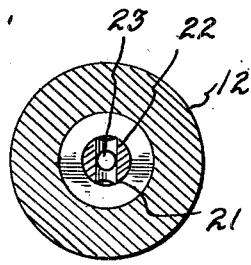
Fig. 5 is an enlarged section taken on line 5—5 of Fig. 3.

In Fig. 4 is shown a section taken through the bore 13 and it will be observed that there is an opening 50 normally closed by the valve 51 threaded in a recess 52. This threaded end of the valve member is provided with a slot 53 so that when the valve is raised from its seat there is an opening provided to atmosphere so that on the filling of the chamber 13 with oil, air pocketed in the upper part thereof may be discharged from the cylinder. After the air is discharged the valve 51 is again seated.

In operation and to fill the system with oil the brake pedal 60 and the lever 35 are reciprocated which reciprocates the plunger 34. Movement of the lever in the direction of the arrow shown in Fig. 1 causes the inner end of the piston 34 to engage against the plug 31 and forces the piston 25 to the right. On movement of the piston 25 to the right any air that may be in the chamber 33 is forced out through the apertures 23, bore 24, unseats the valve 29 and passes into the chamber 13. Upon outward movement of the piston 34, the spring 32 and the spring 26 both tend to move the piston 25 to the left. This causes reduced pressure in the chamber 33 and draws oil into the chamber 33 through the opening 17 unseating the ball valve 18. This may only partially fill the chamber 33 and subsequent movement of the piston 25 to the right under actuation by the piston 34 continues to discharge the air and finally to discharge oil from the chamber 33 into the chamber 13. As this chamber 13 automatically fills with oil, this oil by subsequent movement of the piston 34 is forced out of the chamber 13 through the line 47 to the brake operating mechanism connected therewith as will be readily understood and thus by continued operation of the brake lever 60 the hydraulic system becomes fully charged with oil.

Thereafter, upon movement of the brake lever 60, pressure on the oil in the chamber 13 is transmitted to the entire system through the conduit 47 and under this condition the piston 34 may not strike the end of the piston 25 as in the initial charging above described. The piston 25 will not move only to such extent that the oil pressure in the chamber 33 is equal to that applied by the piston in the bore 13.

It is to be noted that the ball valve 18 and the ball valve 29 prevent respectively the discharge of oil from the chamber 33 backward into the receptacle and from the chamber 13 into the chamber 33. Thus, fluid under pressure in the chamber 13 cannot be discharged except through the line 47 to the braking elements and also it will be noted that any slight movement of the piston 25 to the left by action of the spring 32 draws oil into the chamber 33. The suction produced by movement to the left of the piston 34 simultaneously draws oil into the chamber 33. Thus, under successive movements of the piston 34 by the brake lever 60, the system is first charged and is thereafter continuously maintained automatically in a fully charged condition. Normally after the system is charged the piston 34 does not strike the end of the piston 25, its movement being limited to that required to deliver sufficient volume of fluid in the bore 13 and the line 47 to actuate the brake elements. It will be noted that my improved charging system avoids the application of suction to the service conduits or chambers and thus eliminates possibility of drawing air into the system.

The recharging is accomplished by means of the piston 25 which is engaged by the piston 34 on movement of the brake lever in applying the brake and thus is moved to force the oil from the chamber 33 into the piston chamber 13 under the pressure of the oil in the chamber 13 and service conduits. On withdrawal movement of the piston 34 through release of the brake lever, the piston 25 moves outwardly of its chamber 33 by action of the spring 32 into the chamber 13 and draws oil from the receptacle into the chamber 33 and thus to a major extent relieves the suction in the chamber 13 connected with the service conduits otherwise resulting from displacement of the piston 34.

From the foregoing description it is evident that the charging device is simple in construction, and automatic in operation both to charge the system and to maintain it in a charged condition, and that no manual filling of the system is required other than maintaining a body of oil or other fluid in the receptacle.

Having thus fully described my invention, what I claim and desire to secure by Letters Patent of the United States is—

1. In an apparatus of the character described, the combination with an oil receptacle, a brake lever, a piston and a cylinder in which the piston is reciprocable by operation of the lever, of a second piston operable in one direction by the first named piston, a cylinder in which the second piston is movable and from which fluid is discharged to the cylinder of the first piston by movement in one direction, a spring for moving the second piston in the opposite direction, means whereby said movement in the opposite direction withdraws oil from the receptacle to the cylinder of the second piston, and a conduit open to the cylinder of the first named piston into which oil is discharged by movement of the first named piston.

2. In apparatus of the character described, an oil receptacle, a pair of cylinders in axial alignment, a piston reciprocable in each cylinder, the piston of one cylinder extending outwardly through the end thereof, a lever for the operation of the said piston connected with said extending end, the second piston extending into the cylinder of the first piston, a spring tending to move the second piston into the first cylinder, an aperture leading from the receptacle into the end of the cylinder of the second piston, a check valve tending to prevent flow from the second cylinder into the receptacle, the second piston having a longitudinal aperture through which oil may flow, a check valve controlling the flow therethrough and closed by pressure in the first piston cylinder, the said second piston being operable by movement of the first piston to force oil from the cylinder of the second piston through the piston therefor into the first cylinder, movement of the second piston by its spring drawing oil from the receptacle into the cylinder therefor, and a conduit through which oil from the first cylinder is discharged by movement of the piston therein.

3. In apparatus of the character described, an oil receptacle, two axially aligned cylinders in the bottom of the receptacle, one being of greater diameter than the other, a piston in each cylinder, a lever with which the larger piston is connected and by means of which it may be reciprocated, the second piston of smaller diameter extending into the larger cylinder, said second piston having a head, a coiled spring about the second piston extending between the head and the bottom of the large cylinder and tending to move the second piston in one direction, a passageway leading from the end of the second cylinder to the receptacle, a check valve preventing flow outwardly into the receptacle from the second cylinder, a pasageway for fluid through the second piston into the first cylinder, a check valve controlling the said passageway to prevent a flow of oil from the first cylinder into the second cylinder, a conduit leading from the cylinder of larger diameter through which oil is discharged by movement of the piston therein in one direction, movement of the said piston to discharge oil into the conduit tending to cause movement of the second piston and discharging oil from the cylinder of the second piston into the first cylinder, and movement of the second piston in the opposite direction drawing oil from the receptacle into the cylinder therefor.

4. In a device of the character described, the combination with an oil receptacle, of a brake lever, a piston connected therewith, a cylinder in which the piston is reciprocatable by operation of the brake lever, a conduit through which oil is discharged from the cylinder on normal movement of the brake lever in one direction, a chamber means movable in said chamber engaged by the piston upon movement of the brake lever to an extent greater than normal in the same direction adapted to discharge oil into the cylinder, and to withdraw oil from the receptacle to the chamber as the piston is moved in the opposite direction.

In testimony whereof, I sign this specification.

JOY S. REYNOLDS.